United States Patent
Rocher

(10) Patent No.: US 7,126,344 B2
(45) Date of Patent: Oct. 24, 2006

(54) DIAGNOSTIC DEVICE FOR AN ANTENNA

(75) Inventor: Jacques Rocher, St Orens (FR)

(73) Assignee: Siemens VDO Automotive, Toulouse Cedex (FR)

( * ) Notice: Subject to any disclaimer, the term of this patent is extended or adjusted under 35 U.S.C. 154(b) by 721 days.

(21) Appl. No.: 10/201,320

(22) Filed: Jul. 24, 2002

(65) Prior Publication Data

US 2003/0034925 A1 Feb. 20, 2003

(30) Foreign Application Priority Data

Aug. 2, 2001 (FR) .................................. 01 10392

(51) Int. Cl.
  *G01R 31/06* (2006.01)
  *H04B 17/00* (2006.01)
(52) U.S. Cl. .................................... 324/546; 455/115.1
(58) Field of Classification Search ............... 324/546; 455/115.1; 343/703
  See application file for complete search history.

(56) References Cited

U.S. PATENT DOCUMENTS

| | | | |
|---|---|---|---|
| 2,031,016 A * | 2/1936 | Taborsky | 324/546 |
| 3,604,000 A * | 9/1971 | Briana et al. | 342/173 |
| 3,667,034 A * | 5/1972 | Freeze | 324/547 |
| 4,075,553 A * | 2/1978 | Bouverot et al. | 324/233 |
| 4,757,277 A * | 7/1988 | Nakase et al. | 330/306 |
| 5,396,179 A * | 3/1995 | Domenichini et al. | 324/546 |
| 5,525,996 A * | 6/1996 | Aker et al. | 342/104 |
| 5,654,644 A * | 8/1997 | Zydek et al. | 324/654 |
| 5,907,242 A * | 5/1999 | Gard | 324/326 |
| 6,437,577 B1 * | 8/2002 | Fritzmann et al. | 324/523 |
| 6,905,074 B1 * | 6/2005 | Charrat | 235/492 |
| 2004/0070533 A1 * | 4/2004 | Azuma | 342/174 |

FOREIGN PATENT DOCUMENTS

DE 198 20 207 A1 11/1999

* cited by examiner

*Primary Examiner*—Anjan Deb
(74) *Attorney, Agent, or Firm*—Young & Thompson

(57) ABSTRACT

A diagnostic device for an antenna includes a coil (20) or the like connected on the one hand to a reference potential and on the other hand to the output of an amplifier (12), including two condensers (C2, C3) mounted in series, a first condenser (C2) being mounted in parallel with the coil (20) and the second condenser (C3) being inserted between a terminal of the coil (20) and the reference potential. The device is configured for the detection of the presence of an antenna in a hands free automotive vehicle system.

13 Claims, 1 Drawing Sheet

DIAGNOSTIC DEVICE FOR AN ANTENNA

FIELD OF THE INVENTION

The present invention relates to a diagnostic device for an antenna, particularly an antenna used in a hands free system of an automotive vehicle.

BACKGROUND OF THE INVENTION

A hands free system permits access to a vehicle and starting it without having to use a mechanical key. The user of the vehicle is thus simply provided with an electronic card (also called in what follows a badge) which is detected and recognized by a control and management device associated with antennas disposed onboard the vehicle. If the badge is identified by the control and management device as being a badge permitted to the vehicle, the bearer of this badge can enter the vehicle simply by using a door handle and start the motor of the vehicle by simple action on a button.

Generally, for such a hands free system, a group of antennas is adapted to detect the presence of the badge outside the vehicle and another within the vehicle. If an authorized badge is detected outside the vehicle, the control and management system will permit access to the vehicle without however permitting starting, whilst if the badge is within the vehicle, a starting of the motor could take place.

To locate the badge, a signal is sent to a group of antennas which carry out a corresponding emission, whilst no signal is sent to the other antennas so that they remain inactive. The antennas used are LF (low frequency) antennas emitting a magnetic field of a frequency conventionally about 125 kHz with a restricted range thereby permitting carrying out good location of the corresponding badge. The dialogues between the internal antennas and the badge are of a different nature from the dialogues between the external antennas and the badge. This permits the badge to recognize in advance the response desired by the vehicle. This response is generally effected by emission of an RF (radio frequency) signal of a frequency generally of about 433 MHz.

Each antenna is electrically similar to a coil and is positioned in the vehicle as a function of the desired emission zone. An electronic device permitting generating a signal, modulating it and sending it to the coil is associated with the antenna. This electronic device is generally integrated into the control and management computer provided in vehicles for the electronic management of the interior of the passenger compartment of the vehicle. The antenna is thus connected to the computer by means of a cable and connectors.

The problem which thus arises is to be sure that the antenna is well connected to the computer. Thus, a branched antenna is difficult to detect and of course causes several anomalies of operation of the hands free system.

SUMMARY OF THE INVENTION

The present invention thus has for an object to provide a device permitting detecting the presence and the good connection of an antenna to its control device. Preferably, this device will be simple, not very costly and easily integrated into an antenna or its associated computer.

To this end, it provides a diagnostic device for an antenna comprising a coil or the like connected on the one hand to a reference potential and on the other hand to the output of an amplifier.

According to the invention, this diagnostic device comprises two condensers mounted in series, a first condenser being mounted in parallel to the coil and the second being inserted between a terminal of the coil and the reference potential.

Such a device permits, by measuring the voltage at the terminals of the second condenser, monitoring the presence or absence of the antenna. By selecting suitable values for the capacitances of the added condensers, the voltages measured in the case of the presence or absence of the antenna can be quite different, thereby facilitating the detection of the presence or absence of the antenna.

Preferably, the first condenser mounted in parallel with the coil forms a high impedance oscillating circuit at the emission frequency of the antenna, for example 125 kHz. Thus, the condenser mounted in parallel with the coil permits limiting the current at the output of the amplifier.

So as to obtain at the terminals of the second condenser voltage values of different levels when the antenna is present or absent, the capacitance of the first condenser mounted in parallel to the coil is preferably at least five times less than the capacitance of the second condenser inserted between the coil and a reference potential.

In a preferred embodiment of the diagnostic device according to the invention, a third condenser is mounted between the amplifier and the coil to cut a possible continuous component of the signal of the amplifier. The capacitance of this third condenser is for example substantially equal to that of the second condenser mounted between the coil and the reference potential.

DETAILED DESCRIPTION OF THE INVENTION

In this embodiment, the value of the capacitance of the first condenser mounted in parallel with the coil, is for example comprised between 1 and 100 nF whilst the values of the capacitances of the second and third condensers are thus for example comprised between 0.5 and 10 µF. These values are suitable for an antenna adapted to emit signals at a frequency of 125 kHz and having an inductance of the order of 38 µH, which corresponds to the antennas conventionally used for hands free systems in an automotive vehicle.

To measure the voltage at the terminals of its second condenser, the diagnostic device according to the invention preferably moreover comprises a microcontroller permitting measuring the voltage at the terminals of this condenser.

A diagnostic device for several antennas, comprises itself preferably a diagnostic device as described above for each of the antennas as well as a multiplexer permitting connecting an input of a microcontroller adapted to measure the voltage at the terminals of each second condenser, to each of the antennas.

The present invention also relates to a management and control device for the emission of signals with the help of antennas, characterized in that it comprises at least one diagnostic device as described above.

BRIEF DESCRIPTION OF THE DRAWINGS

The details and advantages of the present invention will become more apparent from the description which follows, with reference to the accompanying schematic drawing, in which.

Figure 1:
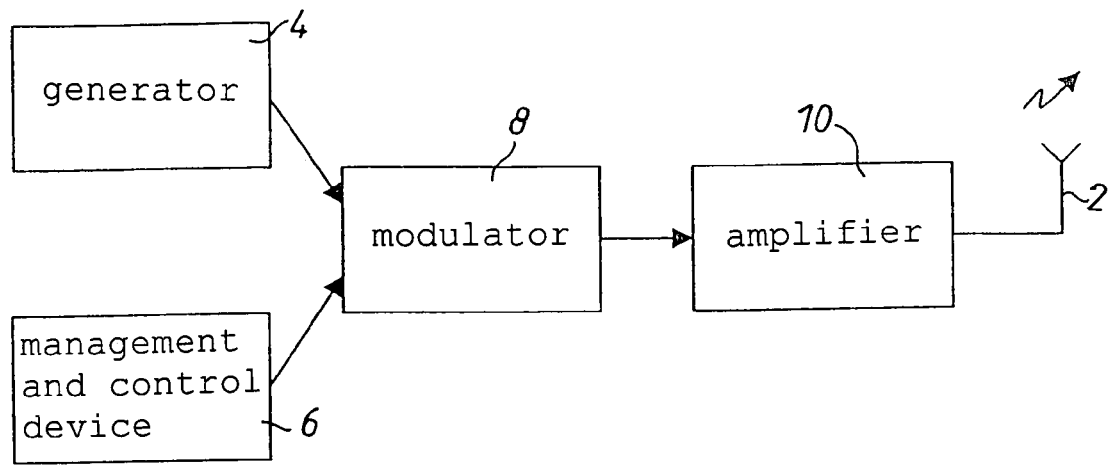
FIG. 1 is a diagram explaining the operation of an antenna.

The description which follows is given with respect to an antenna mounted on an automotive vehicle and adapted to be used in a hands free system permitting the bearer of a badge to have access to and/or start the vehicle without using a mechanical key. Such a system is known to those skilled in the art and is not described in detail here. It is also known in such a system to use antennas emitting low frequency (LF) signals to communicate with a badge possibly present in the vicinity. The frequency used in the hands free systems is generally 125 kHz. There will be considered in the following such an antenna which can emit signals at this frequency. Of course, the invention can also be applied to an antenna emitting signals of different frequency and for other uses.

So that the antenna 2 can emit a signal, in a conventional way, there is used a generator 4 of a sinusoidal signal of a frequency of 125 kHz. In the case of use in a hands free system, the signal is used to send data to a badge. A management and control device 6 supplies the data to be transmitted by the antenna 2. The sinusoidal signal of 125 kHz and the data to be transmitted are introduced into a modulator 8 which "assembles" the signal and the data which it receives to provide the signal to be emitted. This signal then passes into an amplifier device 10 presently called a "driver".

All the various elements, generator 4, management and control device 6, modulator 8 and amplifier 10 are generally disposed in a same housing or computer disposed for example at the level of the dashboard of a vehicle. The antenna 2 is itself disposed remote from this housing, for example integrated into a door handle or into the roof of the vehicle, as a function of the zone in which it must emit. A cabled connection thus permits connecting the antenna 2 to its computer with the help of connectors. In general, several antennas correspond to a same computer.

Figure 2:
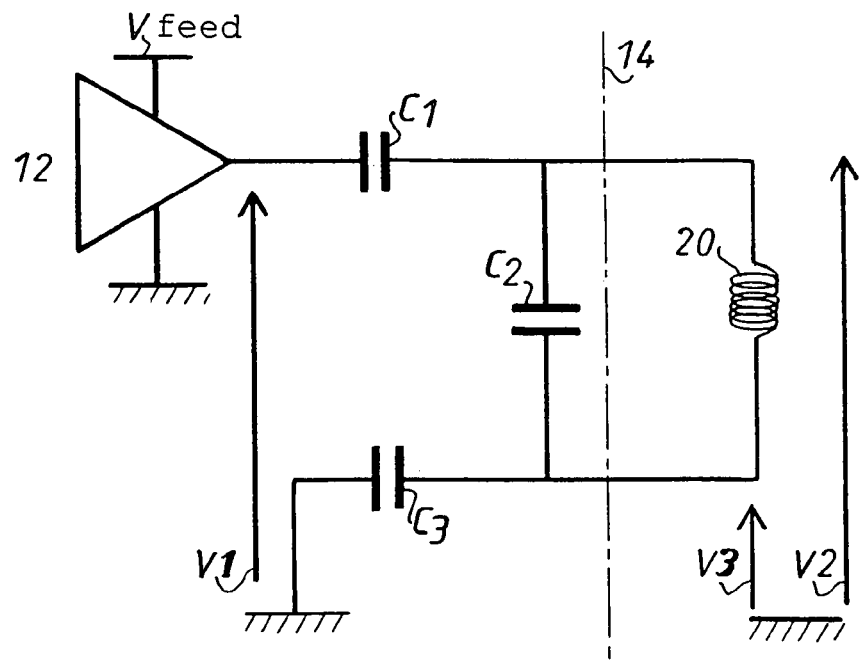
FIG. 2 is an electrical diagram of the principle showing a diagnostic circuit according to the invention.

The problem which thus arises is to ensure that each antenna is properly connected to the computer to guarantee good operation of the hands free system. FIG. 2 shows a diagnostic circuit permitting easily monitoring the presence (or detecting the absence) of an antenna.

In this figure, there will be seen a coil 20 corresponding to the antenna 2 in FIG. 1, as well as an amplifier 12 and three condensers C1, C2 and C3. A broken line 14 indicates a wall of the housing of the computer to which is connected the antenna 2. The elements (amplifier 12 and condensers) shown at the left of this line 14 in FIG. 2 are located in the housing of the computer whilst those located to the right (coil) are located outside the computer.

The amplifier 12 is supplied with a voltage Vfeed which can be supposed in what follows to be equal to 24 V. At the output of this amplifier, is the condenser C1. Such a condenser is almost always present at the output of an amplifier in the case of an emitter. It is used to suppress the continuous component of the output signal of the amplifier so as to send a purely alternating signal to the emitting coil 20.

The coil 20, in a conventional emitter, is thus mounted in series with the condenser C1, between the latter and a reference potential. In the device of the invention, two condensers are added. The condenser C2 is mounted in parallel with the coil 20 whilst the condenser C3 is mounted in series between the reference potential and the assembly forming the resonant circuit of the condenser C2 and coil 20.

There is thus shown, at the output of the amplifier 12, the three condensers C1, C2 and C3 mounted in series whilst the coil 20 is mounted in parallel with the condenser C2. V1 is thus the voltage between the reference potential, for example the mass of the computer, and the output of the amplifier, which is to say at the terminals of the three condensers, V2 is the voltage at the terminals of the condensers C1 and C2, and V3 is the voltage at the terminals of the condenser C3. The inductance of the coil 20 will be called hereafter L.

The assembly of the three condensers C1, C2 and C3 forms a diagnostic circuit and the measurement of the voltage V3 permits knowing whether the antenna 2 (or the coil 20) is correctly connected to the computer. In FIG. 2, the various connectors present between the computer and the antenna 2 have not been shown but are generally necessary given the distance separating the antenna 2 from its computer.

The condenser C2 permits reducing the current at the output of the amplifier 12. The signals sent to the antenna have a frequency of 125 kHz (LF signal) and the resonating circuit formed by the coil 20 of inductance L and the condenser C2 has a high impedance at this frequency.

The condenser C3 itself protects the antenna from a possible short circuit which would be produced at the positive terminal of the battery supplying the emitter.

By way of illustrative example, the numerical values are given hereafter:

$C1=C3=1\ \mu F$ $C2=82\ nF$ $L=38\ \mu H$ (corresponds to the inductance of the LF antennas generally used in hands free systems of automotive vehicles).

In this example, the value of C2 is adapted to the value L to obtain an oscillating circuit of the LC type at the frequency of 125 kHz.

The voltage V1, corresponding to the output of the amplifier, is thus:

$V1=Vfeed/2$ namely with Vfeed=24V, V1=12 V.

The measurement of V3 permits diagnosing the absence or presence of the coil 20 as shown hereafter.

When the coil 20 is connected, it is in parallel with the condenser C2 and short circuits the latter. Because of this, we have:

$V2=V3$

When the amplifier 12 is placed under voltage and no signal is emitted, the condensers C1 and C3 charge and the voltage at their terminals depends on their capacitance. It was supposed above that C1=C3. Because of this, the voltage at the terminals of C1 is the same as that of the terminals of C3, namely V1−V2=V3 and there is thus obtained:

$V3=Vfeed/4$ namely with Vfeed=24 V, V3=6 V.

In the contrary case in which the coil 20 is not connected, the condenser C2 charges as the two other condensers. It thus appears that:

$C2*(V2-V3)=C3*V3$ namely V3=V2*C2/(C2+C3)

Similarly:

$(V2-V3)*C2=(V1-V2)*C1$

From these two latter equations, it can be deduced that:

$$V3=V1*(C1/(C1+(C2*C3)/(C2+C3))*C2/(C2+C3)$$

It will be seen that the value of C2 is low relative to the values of C1 and C3. It is even true that 10*C2<C1. In this case, it will be noted that:

$$V3<V\text{feed}/20$$

With numerical values identical to the above, it is seen that V3=0.84 V.

It will thus be noted that the value of V3 corresponds to a high logic level when the coil 20 is connected, whilst this logic level is low when the coil 20 is not connected.

These two voltage levels can be measured by a microcontroller located in the computer. To this end, an analog input can be provided to insert the signal V3. When the computer manages several antennas, an analog multiplexer is preferably used to connect the analog input of the microcontroller to the diagnostic circuits of each antenna. Each antenna thus has a diagnostic circuit of the type of that described above and a single microcontroller is used to measure the voltage V3 of these circuits.

The three condensers C1, C2 and C3 are used here as a capacitative dividing bridge. In the case in which the antenna is correctly connected, this capacitative bridge is balanced.

The diagnostic circuit proposed above permits verifying at low cost the presence of the antenna and its good connection. Fewer components (two condensers) are necessary to make this circuit and moreover they are low cost. The presence of this diagnostic circuit at the output of the computer does not modify moreover the electrical parameters of the signals sent to the antenna. Another advantage of this diagnostic circuit is that it permits, in addition to the detection of the presence or absence of the antenna, detecting a short circuit of the coil, or of the antenna, to the ground: when the antenna is short circuited to the ground, the low voltage level is detected.

The present invention is not limited to the embodiment described above by way of non-limiting example. It relates also to all modifications of embodiment within the scope of one skilled in the art, within the scope of the following claims.

Thus, the numerical values are given by way of illustrative example. The capacitances of the condensers used are determined for each antenna as a function particularly of the impedance or inductance of the latter and of the frequency of the signals which it emits. Moreover, for given values of frequency and inductance, the values of the capacitances can vary within a relatively wide range. In the example given above and shown in the accompanying drawing, the value of. C3 thus is not necessarily equal to the value of C1. It is simply preferably of the same order of magnitude. Similarly, C2 is preferably much lower in value than C1 and C3. However, as computation shows, other values can be found to obtain in one case a low voltage level and in the other case a high voltage level.

Finally, the example described above is given with reference to an antenna of a hands free system of automotive vehicles, but it can find other applications in which an antenna is connected to its driver and is remote from the latter.

The invention claimed is:

1. Diagnostic device for an antenna (2), comprising:
a coil (20) connected on the one hand to a reference potential and on the other hand to the output of an amplifier (12), first and second condensers (C2, C3) mounted in series, the first condenser (C2) being mounted in parallel to the coil (20) and the second condenser (C3) being inserted between a terminal of the coil (20) and the reference potential.

2. Diagnostic device according to claim 1, characterized in that the first condenser (C2) mounted in parallel with the coil (20) increases the impedance of the coil (20) and forms an oscillating circuit of high impedance at the emission frequency of the antenna.

3. Diagnostic device according to claim 1, characterized in that the capacitance of the first condenser (C2) mounted in parallel to the coil is at least five times less than the capacitance of the second condenser (C3) inserted between the coil (20) and the reference potential.

4. Diagnostic device according to claim 1, characterized in that a third condenser (C1) is mounted between the amplifier (12) and the coil (20) to cut a continuous component of the amplifier signal.

5. Diagnostic device according to claim 4, characterized in that the capacitance of the third condenser (C1) is substantially equal to that of the second condenser (C3) mounted between the coil and the reference potential.

6. Diagnostic device according to claim 5, characterized in that the capacitance of the first condenser (C2) mounted in parallel with the coil (20) is comprised between 1 and 100 nF whilst the capacitances of the second (C3) and third (C1) condensers are comprised between 0.5 and 10 µF.

7. Diagnostic device according to claim 1, characterized in that it comprises moreover a microcontroller permitting measuring the voltage (V3) at the terminals of the second condenser (C3).

8. Diagnostic device for several antennas, characterized in that it comprises a diagnostic device according to claim 1 for each of the antennas as well as a multiplexer permitting connecting an input of a microcontroller adapted to measure voltage, to the terminals of each second condenser at each of the antennas.

9. Management and control device for the emission of signals with the help of antennas, characterized in that it comprises at least one diagnostic device according to claim 1.

10. Diagnostic device according to claim 1, wherein the emission frequency of the antenna is 125 kHz.

11. Diagnostic device according to claim 1, characterized in that a third condenser (C1) is mounted between the amplifier (12) and the coil (20).

12. Diagnostic device for an antenna (2) comprising:
a coil (20) connected on one end to a reference potential and on another end to an output of an amplifier (12); and two condensers (C2, C3) mounted in series, a first of the condensers (C2) being mounted in parallel to the coil (20) and the second of the condensers (C3) being inserted between a terminal of the coil (20) and the reference potential, wherein, the capacitance of the first condenser (C2) mounted in parallel to the coil is at least five times less than the capacitance of the second condenser (C3) inserted between the coil (20) and the reference potential.

13. Diagnostic device for an antenna (2) comprising:
a coil (20) connected on one end to a reference potential and on another end to an output of an amplifier (12);

two condensers (C2, C3) mounted in series, a first of the condensers (C2) being mounted in parallel to the coil

(20) and the second of the condensers (C3) being inserted between a terminal of the coil (20) and the reference potential;

a third condenser (C1) mounted between the amplifier (12) and the first coil (20), wherein, the capacitance of the third condenser (C1) is substantially equal to the capacitance of the second condenser, the capacitance of the first condenser is comprised between 1 and 100 nF, and the capacitances of the second (C3) and third (C1) condensers are comprised between 0.5 and 10 µF.

* * * * *